May 14, 1957  W. T. MILLER  2,792,377
POLYTRIFLUOROCHLOROETHYLENE PLASTIC

Filed Sept. 1, 1953 2 Sheets-Sheet 1

INVENTOR
WILLIAM T. MILLER

BY *Frank A. Bower*

ATTORNEY

# 2,792,377

POLYTRIFLUOROCHLOROETHYLENE PLASTIC

William T. Miller, Ithaca, N. Y.

Application September 1, 1953, Serial No. 377,930

8 Claims. (Cl. 260—33.8)

The present invention relates to high polymers obtained by the polymerization of trifluorochloroethylene.

This application is a continuation-in-part of my copending application Serial Number 730,176, filed February 21, 1947, now U. S. Patent No. 2,667,474, and a continuation-in-part of my co-pending application Serial Number 601,387, filed June 25, 1945, now abandoned. My application Serial Number 730,176 is a continuation-in-part of my application Serial Number 601,387.

An object of the invention is to provide a novel, solid, high molecular weight polymer.

More particularly, an object of the invention is to provide a hard, strong polymer capable of being shaped into articles of manufacture and combining the properties of chemical stability and mechanical characteristics which render it uniquely workable and useful in many practical applications as a construction material.

Another object of the invention is to provide methods for processing the high molecular weight polytrifluorochloroethylene plastic to obtain a variety of physical properties.

A further object is to provide plasticized compositions of the high molecular weight polytrifluorochloroethylene plastic.

The above and other objects will become apparent in the course of the following description and disclosure. For a long time there has been a search for a material which can be used to construct useful articles and which at the same time possesses chemical and thermal stability of a high order. The need for construction materials resistant to the action of highly corrosive chemicals, to the deteriorating effects of oxygen and light, and to the dissolving action of various materials has been great. In chemical processing the action of acide, alkalis, oxidizing agents, reducing agents, corrosive halides, etc. have imposed serious and expensive limitations upon processing equipment. While it has been possible in most cases to employ resistant metals, alloys, ceramics, carbon or other material resistant to the particular agents involved for the construction of the principal processing equipment, it has been difficult to find materials possessed of the properties of resiliency desirable for equipment gaskets, valve seats and the like and further to find materials possessing the property of transparency for use as sight glasses, observation windows, instrument covers, etc. Aside from these applications in the presence of strong chemical agents, there are other equally critical needs for resilient and in some cases for transparent materials which have great resistance to the solvent action of various substances. Recently there has been produced a plastic possessing many of these desired properties. This material is known as polytetrafluoroethylene. While the substance is very stable chemically and is very useful for many of the industrial purposes indicated, it has been found difficult to fabricate, is undesirably soft for some purposes, lacks sufficient mechanical strength for many uses, is waxy in texture and is generally opaque, and is insolubl in solvents even at high temperatures.

In accordance with the present invention a plastic is provided of unusual chemical stability which by comparison with polytetrafluoroethylene is easy to fabricate, is hard, resilient, has high mechanical strength and can be made transparent in relatively thick sections. This plastic has unique properties in its finished state and the handling properties are found to be similar to those of other known thermoplastic polymeric substances. This plastic shows a lesser absorption of fluorocarbons than the polytetrafluoroethylene. On the other hand, the plastic of this invention absorbe low molecular weight perchloro and perchlorofluorocarbon-compounds which act as swelling agents. The plastic of the present invention can be plasticized readily with perfluorochloro-compounds of lower molecular weight to produce plasticized compositions with a variety of physical properties which retain the desirable characteristic of high stability. In this characteristic of plasticization this plastic is especially outstanding by comparison with tetrafluoroethylene. Other plasticizers can be used, particularly the halogenated hydrocarbons where the stability characteristics of the mixture are satisfactory for a desired purpose. For example, trichloroehylene can be used to plasticize the plastic.

The plastic of this invention can furthermore be uniformly dispersed in selected organic solvents such as liquid cholor and chlorofluoro derivatives of hydrocarbons in perfluorochloro-compounds such as $$CF_2ClCFClCFClCF_2Cl$$

and dissolved at relatively elevated temperatures, usually above 100° C., to form useful solutions. For the preparation of solutions temperatures are utilized in the range of about 100° C. to about 300° C. with the preferred working range about 150° C. to 275° C. At ordinary temperatures such as below 30° C. the polymer is insoluble in any known solvents. Coatings may be satisfactorily applied or films cast from solution provided the removal of solvent is carried out at moderately elevated temperatures.

The product provided by the invention is of high molecular weight, generally an average molecular weight above 50,000 as determined by osmotic pressure in a special solvent at elevated temperature. The product is made by polymerizing trifluorochloroethylene. This polymerization can be performed in a variety of ways. Conditions favorable to the polymerization include the use of polymerization promoters, and the use of moderate to high pressures. A number of variations in the polymerization process are indicated in the examples set out below. A preferred method for performing the polymerization involves the use of moderate pressures and low temperatures during the polymerization with a polymerization promoter of the free radical type such as an organic peroxide. An example of this preferred type process with bis-trichloroacetyl peroxide as the promoter is found below as Example 9. Examples of polymerization of trifluorochloroethylene at room temperatures are found in other examples. Other polymerization procedures found effective include the use of other peroxides, oxygen, or boron triflurode etherate as the promoter, some of which are described in the examples. Polymer within the high range of molecular weights has also been produced by the action of ultra violet light.

The conditions used in the polymerization can be selected to control the average chain length of the polymer and the distribution of polymer molecules of various chain lengths in the product so as to vary the properties of the product as to solubility, strength and fabricating characteristics. The valuable mechanical properties of the product of this invention, such as resilience, are associated with high molecular weight polytrifluorochloroethylene and are not characteristic of the relatively low molecular weight solid polymeric trifluorochloroethylene polymers which have at best the characteristics of a hard wax.

The preparation of a solid polytrifluorochloroethylene differing from this present material and of such low molecular weight as to be shaped by pressing at 100° C. has been described or published.

In making the unique, high polymer of this invention, operations at room temperature, about 20–25° C., or preferably below with the addition of a promoter under conditions which result in relatively slow rates of polymerization, are favorable for obtaining the solid plastic high molecular weight polymer of trifluorochloroethylene. Carefully purified monomer is utilized. In general rates of polymerization not exceeding an average conversion of about 1% per hour with total conversions of at least 5% polymer are preferred. The product of this invention may not be prepared at temperatures substantially above 50° C. by a satisfactory method.

I have found that the subject of this invention, said plastic high molecular weight polymer of trifluorochloroethylene, has valuable mechanical properties in particular as regards strength and resilience over a wide temperature range including relatively high temperatures, such as below −100° C. and above 150° C. Temperatures above about 210° C., the transition temperature of the material, are necessary for molding the polymer of this invention and preferably substantially above. Solid polymeric trifluorochloroethylene which is of sufficiently low molecular weight and melting point to be satisfactorily molded at 100° C. does not possess useful mechanical properties of strength and resiliency and such low molecular weight material is outside the scope of the present invention.

At the temperature of about 210°±5° C. the high molecular weight polymer of this invention undergoes a phase change from forms containing varying amounts of crystalline regions to a non-crystalline amorphous form. This transition temperature of about 210° C. is characteristic of all the high polymers of this invention in contrast with the varying, lower transition temperatures of lower molecular weight polymers of trifluorochloroethylene such as the waxes.

It is desirable to emphasize that the valuable mechanical properties of the product of this invention are associated with the high molecular weight polytrifluorochloroethylene as described hereinafter and are not found in solid polymers of trifluorochloroethylene of lower molecular weight. The low polymers lack the valuable strength, toughness, resilience and orientability which are found only with high molecular weight polytrifluorochloroethylene of this invention. The combining of the high order of chemical stability of highly fluorinated perhalofluoro compounds with unexpectedly useful and commercially valuable mechanical properties is achieved in the product of the present invention.

Polymerization reactions are ordinarily carried out with liquid monomer with or without the addition of a low molecular weight chlorofluoro compound such as $CF_2ClCFCl_2$ or $CFCl_3$ to serve as a diluent or as a solvent for the addition of promoter. In general the use of relatively low peroxide concentrations and low temperatures favors the formation of higher molecular weight polymer. High pressures while not essential for the production of high molecular weight material favor increased conversion and the formation of higher molecular weight polymer. Conveniently an indication of the molecular weight is obtained by measurement of the no-strength temperature designated NST, that is, the temperature at which tensile strength properties of the polymer are lost. A method of measuring the NST is fully described hereinafter.

An important factor favoring the bulk polymerization procedures is the insolubility of trifluorochloroethylene high polymer in the monomer at the temperature of polymerization. The concentration of monomer in the liquid phase remains nearly constant and the promoter concentration much more so than would be the case if a homogeneous polymer-monomer solution were formed. This facilitates reproducibility of reaction conditions and of polymer products. The insolubility of polymer in monomer results in the formation of a porous final polymer structure and greatly facilitates the removal and recovery of excess unreacted monomer. The ease of separation of the polymer product from the unreacted monomer adapts the production procedure to simple separation techniques. For example, it is possible to rapidly effect separation of the polymer and monomer for instance by vaporization of the monomer from the solid utilizing a relatively short heating period.

The molecular weight distribution of the polymer produced within the high molecular weight range may be controlled by varying the polymerization conditions such as the initial promoter concentration and the temperature of reaction. The reaction conditions may also be altered during the course of a polymerization in order to achieve variations in molecular weight distribution of the polymer produced. For example, promoter may be added intermittently or continuously to an agitated reactor and the temperature of reaction may be varied during the course of a run. The insolubility of the polymer in the monomer at the temperature of polymerization facilitates the use of an agitated reactor. The consequent relative fluidity permits the agitation to bring about a mixing which assists the reaction. It is a feature of this mixing that the temperature in the reacting mass is maintained more constant. With static reactors of large cross section temperature gradients are established within the reactor as polymerization proceeds due to the poor heat conduction of the polymer mass and for such systems the geometry is an important factor in determining reaction conditions throughout the mass. Relatively higher reaction bath temperature with resultant faster rates of reaction may be satisfactorily utilized in the case of agitated reactors, whether operated in a continuous or batchwise fashion, than for static reactors. The tendency for internal temperatures to build up in static reactors due to the difficulty in dissipating the heat of reaction is overcome by agitation. Polymerization may be carried out in a continuous manner by pumping the monomer and promoter through a reactor tube maintained at the desired reaction temperature by an outside bath.

The use of pure monomer is necessary in order to obtain high molecular weight polytrifluorochloroethylene in a reproducible manner. For example, alcohol present in monomer prepared by dechlorination of $CF_2ClCFCl_2$ with zinc and alcohol may be removed by fractional distillation and treatment with $P_2O_5$ or by thorough washing with water followed by drying and distillation. Alkaline washes or solid absorbents may be utilized to remove acid type impurities. It is especially desirable to avoid the presence of alcohol, acetaldehyde, acetone, ethers and other substances which react readily with free radicals and thus inhibit polymerization or reduce the product molecular weight. Ethyl alcohol is an especially effective polymerization inhibitor.

To vary the molecular weight distribution of a product, blending of different molecular weight plastic subsequent to polymerization may also be utilized. Hot milling is the preferred procedure for this purpose.

The following is a list of illustrative and typical physical properties of the high molecular weight, unplasticized polytrifluorochloroethylene for the purposes of this description and not limitative of this invention:

Table 1.—Physical properties

| Properties | ASTM Test Method | Unit of Measure | Results |
|---|---|---|---|
| Molecular weight | | | 50,000–300,000 |
| Transition temperature | | °C | 210 |
| Specific Gravity | D792 | | 2.1 |
| Refractive index | D542 | $n_D^{25}$ | 1.43 |
| Tensile strength: | | | |
| 77° F | D638 | p. s. i | 2,500–6,000 |
| 248° F | D638 | p. s. i | 450–600 |
| Tensile strength (oriented film and fibre) | | p. s. i | 6,000–50,000 |
| Yield strength, 0.2% offset, 77° F | D638 | p. s. i | 2,600–3,640 |
| Elongation | D638 | percent | 18–36 |
| Modulus of elasticity, 77° F.: | | | |
| Tensile | D638 | p. s. i | 192–226×10³ |
| Flexural | D790 | p. s. i | 174–182×10³ |
| Compressive | D695 | p. s. i | 168–191×10³ |
| Compressive strength, 77° F | D695 | p. s. i | 21,000–90,000 |
| Flexural strength: | | | |
| 77° F | D790 | p. s. i | 7,700–8,300 |
| 158° F | D790 | p. s. i | 900–1,800 |
| Stiffness, #300 NST Grade: | | | |
| minus 297° F | D747 | p. s. i | 760–860 |
| 148° F | D747 | p. s. i | 480–520 |
| 32° F | D747 | p. s. i | 230–270 |
| 212° F | D747 | p. s. i | 20,000–24,000 |
| 392° F | D747 | p. s. i | 4,000–4,500 |
| Impact strength, Izod, notched, 77° F | D256 | Ft. lb./in. of notch | 2.2–4.1 |
| Rockwell hardness | D785 | R scale | 111–115 |
| Thermal conductivity | | cal./cm²/sec./° C./cm | 1.44×10⁻⁴ |
| Do | | B. t. u./ft.²/hr./° F./in | 0.418 |
| Specific heat | | cal./gm./° C | 0.216 |
| Thermal coefficient of linear expansion: | | | |
| −80° to 20° C | D696 | in./in./° C | 4.5×10⁻⁵ |
| 20° to 150° C | D696 | in./in./° C | 7×10⁻⁵ |

The following examples illustrate a number of methods by which the high polymer can be prepared.

EXAMPLE 1

Forty grams of trifluorochloroethylene, CF₂=CClF, and 3 grams of benzoyl peroxide were mixed together in a sealed glass tube and let stand at room temperature. Excess undissolved benzoyl peroxide was present in the ampule after mixing. At the end of ten days the liquid phase appeared to be practically completely converted into a white solid. Evaporation of the excess monomer from the olefin polymer mixture left a residue of 4.2 g. of solid high molecular weight polytrifluorochloroethylene containing some undecomposed benzoyl peroxide and decomposition products.

In the method of this exmaple the effective peroxide concentration in the liquid phase was controlled by the limited solubility of benzoyl peroxide in trifluorochloroethylene at room temperature. At the end of the polymerization excess benzoyl peroxide and decomposition products are removed from the trifluorochloroethylene polymer product. This product corresponds to an NST of about 235° to 245° C.

EXAMPLE 2

Trifluorochloroethylene, 69.5 g., and 0.5 g. pelargonyl peroxide, CH₃(CH₂)₇COO₂, were sealed in a small glass bomb. This was placed in a bath maintained at 0° C. for approximately 12 hours, but very little polymerization was observed at that temperature. Pelargonyl peroxide does not serve as an effective source of free radicals at 0° C. The bomb was then allowed to stay at room temperature for approximately 36 hours whereupon polymerization took place. The polymer was then filtered by suction and washed with acetone. The yield of washed high polymer was 9.6 g. Pressing between sheets of aluminum foil at 250° C. yielded a clear rather flexible material similar in appearance to the trifluorochloroethylene high polymer prepared by low temperature polymerization with bis-trichloroacetyl peroxide as a promoter. The polymer was quite transparent and was not brittle even when cooled slowly from the pressing temperature of 250° thus indicating a high molecular weight. The NST is similar to that of Example 1.

EXAMPLE 3

Trifluorochloroethylene containing 0.045% acetyl peroxide (CH₃COO)₂, added in CCl₃F solution, was sealed in a small glass bomb with the exclusion of air. The trifluorochloroethylene was purified by distillation over NaOH and by refluxing over P₂O₅ before final distillation. The total weight of the sample was 86.1 g. The bomb contents were allowed to react at room temperature for 29 days. After distilling off unreacted monomer, extracting with carbon tetrachloride and drying, 24.6 g. of high molecular weight polytrifluorochloroethylene with an NST of 286° C. was obtained.

EXAMPLE 4

Trifluorochloroethylene containing 0.061% chloroacetyl peroxide (CH₂ClCOO)₂, added as pure peroxide, was polymerized at room temperature in an experiment otherwise identical to Example 3. From a total sample weight of 77.2 g., 41.4 g. of high polymeric trifluorochloroethylene with an NST of 295° C. was obtained after 33 days reaction.

EXAMPLE 5

Fifty grams of trifluorochloroethylene and approximately 0.25 gm., of bis-trichloroacetyl peroxide (CCl₃COO)₂ were sealed in a glass bomb and thoroughly mixed. The peroxide utilized contained sodium chloride so that the amount of active peroxide added corresponded to only a part, for instance, from 25 to 50%, of the total weight added (i. e. about 0.06 to 0.12 g.). The glass polymerization bomb was placed in an ice bath which was maintained at 0° C. by melting ice for 48 hours. The bomb was left in the bath for an additional 24 hours, during the last part of which the temperature slowly rose to 20° C. due to complete melting of the ice. After removal of unreacted olefin a 26 g. residue of white spongy solid polymer remained. This polymeric material was stable and did not reduce potassium permanganate in acetone and did not flow as a liquid under the influence of gravity when heated to 250°. By hot pressing the polytrifluorochloroethylene a very tough material which was flexible was obtained. This material has a NST above 225° C.

EXAMPLE 6

Trifluorochloroethylene containing 0.04% bis-trichloroacetyl peroxide was sealed in a small glass bomb with exclusion of air. The total weight of the sample was 84.5 g. The bomb was put in a 0° C. liquid bath for 72 hours. After removal of the unreacted monomer by distillation, solvent extraction and drying, 28.4 g. of high molecular weight polytrifluorochloroethylene with an NST of 272° C. was recovered.

EXAMPLE 7

In a metal vessel with an expansion diaphragm was placed 1260 g. trifluorochloroethylene and 15.9 gms. of bis-trichloroacetyl peroxide assaying about 25 to 50% active peroxide as for Example 5. After mixing the contents the polymerization vessel was placed in a bath maintained at −17 to −20° C. for 128 hours. A yield of 495 gms. of high molecular weight polytrifluorochloroethylene was obtained after removal of unreacted monomer. The product obtained by this low temperature polymerization was of higher molecular weight than that obtained at 0° as evidenced by its greater melt viscosity manifested by the higher pressure required when the product was formed into sheets by hot pressing.

The polymer product was mechanically worked at 250° C. with an equal weight of trifluorochloroethylene polymer oil of B. P. 150–254° C. at a pressure corresponding to 1 mm. of mercury (prepared as described in my copending application Serial No. 743,455, filed April 23, 1947, now Patent No. 2,700,661) until a homogeneous mixture was obtained. Sheets prepared by hot pressing the resulting material were much more flexible and softer than those prepared from the parent polymer. The plasticized polymer when cut into strips could be pulled out more easily than the unplasticized polymer during which process the polymer molecules were orientated as determined by the resulting increased tensile strength of the polymer.

A completely fluorinated oil of B. P. 116–160° C. at 11 mm. mercury pressure was prepared by fluorination of a hydrocarbon oil so as to obtain a product with essentially all hydrogens replaced by fluorine. This oil was not found to be compatible with the high molecular weight polytrifluorochloroethylene and no appreciable absorption of the perfluoro-oil at room temperature could be obtained even by mechanically working at temperatures up to 275° C. This material has an NST above about 240° C.

EXAMPLE 8

A mixture of 797 grams trifluorochloroethylene $$(CF_2=CFCl)$$

and about 0.6 of a gram of purified bis-trichloroacetyl peroxide, 0.08%, was transferred to a thin walled lead container at −78° C. The container was filled to overflowing, warmed to the boiling point of the mixture, about −26° C., to remove dissolved gases, then cooled to −78° C. While maintaining nitrogen gas above the liquid surface, and finally the container neck was clamped shut and sealed by fusing. The sealed container was placed in a tight chamber and subjected to fluid pressure at 13,900 to 16,000 pounds per square inch at −17° to −14.5° C. for four days and 1½ hours. Thereafter the container was opened and the solid product, comprising 385 grams of white high molecular weight polytrifluorochloroethylene having a NST of 305° C., recovered. This represents a yield of 48%.

EXAMPLE 9

17 lbs. 2 oz. of trifluorochloroethylene purified by fractional distillation from $P_2O_5$ was charged into a 6″ diameter stainless steel bomb at −78° C., together with 84 g. of a 2.03% solution of trichloroacetyl peroxide in trichlorofluoromethane. 25 cc. additional trifluorochloroethylene was used to wash the tubing through which the peroxide solution was added. The bomb was evacuated to about the vapor pressure of the contents and sealed after which the contents were mixed by shaking and the temperature of the bomb raised to about −16° C. The bomb was then maintained at this temperature for about 10 days.

The non-volatile product of the above reaction comprised 6 pounds of high molecular weight polytrifluorochloroethylene having a NST of 315° C.

EXAMPLE 10

A thick walled Pyrex glass bomb was filled at −78° C. with 100 gms. of $CF_2=CFCl$ and 2.5 gms. of boron trifluoride methyl etherate [$(CH_3)_2O—BF_3$]. The bomb was pumped to remove any entrapped air and then sealed. The bomb was shaken to mix the contents and placed in a cold bath. The [$(CH_3)_2O—BF_3$] was only partially soluble. No polymerization occurred in 24 hours at −16° C. The tube was then warmed to room temperature for about 30 days. At room temperature polymerization began to occur very slowly and continued at what appeared to be a steady rate. It was considered that the boron trifluoride etherate furnished a small constant partial pressure of $BF_3$ depending upon the temperature of the reaction.

The non-volatile product of the above reaction comprised 12.3 gm. of polytrifluorochloroethylene having a NST of 308° C.

EXAMPLE 11

About 10 ccs. of liquid trifluorochloroethylene was charged below its boiling point into a high pressure reaction vessel and held under a pressure of 16,000 kilograms per square centimeter for 21 hours at room temperature. Essentially all of the trifluorochloroethylene was converted into high molecular weight polytrifluorochloroethylene having an NST above 225° C. No promoter was added in this run but the possibility of atmospheric oxygen acting as a promoter is not precluded. The equipment used in attaining the high pressure described was designed by P. W. Bridgman and is described in his book "The Physics of High Pressures" published in 1931.

Each of the examples disclose polymer material according to this invention which is orientable, resilient and inert under proper conditions.

The product obtained by the polymerization methods described operating at low to moderate pressures is a white spongy material. At high pressures a more compact material is normally obtained. The material is then ordinarily fabricated as a high molecular weight thermoplastic polymer at temperatures above its transition temperature. The physical properties of the fabricated polymer may be usefully varied by thermal treatment or by incorporation of a plasticizer as described below.

In lieu of the promoters used in the examples, ultra violet light may be used to promote the polymerization. The polymers produced by the methods of the examples and by other polymerization techniques have a variety of useful properties. The physical properties cover a range of strengths, hardnesses, softening points, etc. Some of these properties can be correlated with the method of preparation and others with a special test described below, but in all cases the useful mechanical properties are associated with high molecular weight trifluorochloroethylene.

The polymer is not adaptable to conventional molecular weight determination at ordinary temperatures because of its insolubility in organic solvents. A simple test was devised instead which gives relative measures of molecular weight as proportional to melt viscosity based on a careful measurement of the temperatures at which all strength properties are lost by the molten polymer. This temperature is referred to in the following examples as the no-strength temperature and is abbreviated NST. The NST also serves as a useful guide in pressing and molding work. In measuring NST a specific apparatus is used as illustrated in the drawings wherein:

Figure 1:
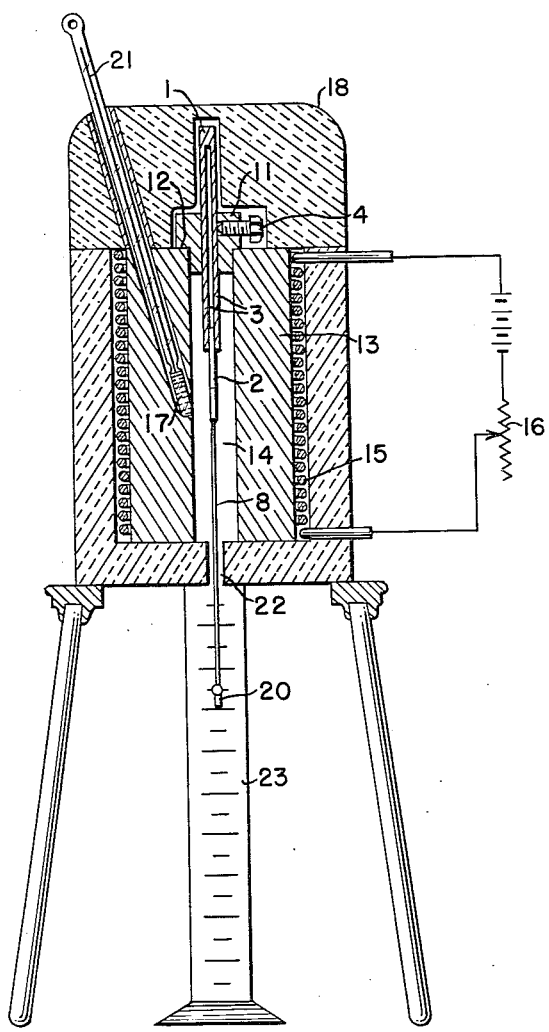
Fig. 1 is an elevation of an NST measuring apparatus with the heating unit in vertical section.
Figure 2:
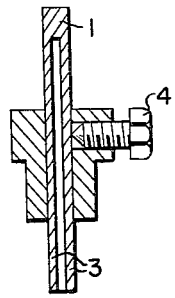
Fig. 2 is a detail view of the test sample and sample clamp, the clamp being partly shown in axial section.

As shown in Figs. 1 and 2 the sample 2 is clamped between the jaws 3 of the clamp 1 by tightening the set screw 4. The clamp 1 is an extension of the plug 11 which is inserted into the bore 14 of the tube 13. The plug 11 serves to center the sample 2 in the bore 14 of the tube 13 and the flange 12 limits the extent to which the plug may be inserted in the bore. The tube 13 is heated by electrical heating element 15. The temperature of the heating element is controlled by a resistance 16. The temperature of the block is measured by a thermometer 21 in the thermometer well 17. The apparatus is thermally insulated by the insulating members 18 and 19 and member 18 can be removed to give access to the plug 11. A weight 20 is attached to sample 2 by a free hanging wire 8 which passes through the insulation 19 at hole 22. A scale 23 serves to indicate the movement of the weight 20. The test is performed by clamping a sample of specified dimensions of polymer into the clamp as shown in Fig. 1, placing it in the heater in the position shown in Fig. 1, and heating it slowly until it breaks. The dimensions of each sample must be reproduced to careful specifications. The sample 2 is notched at the center 6 to insure its breaking at this point.

Figure 3:
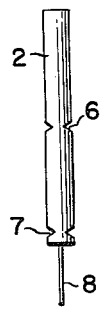
Fig. 3 is a detail view of the test sample.

A sample of polytrifluorochloroethylene, produced by the method of Example 8 and hot pressed into a 1/16" thick sheet was cut into a strip 1/8" by 1/16" by 2" and notched as indicated in Figs. 2 and 3 to a thickness of 3/64 by 1/16" at notch 6. A fine wire 8 and weight 20 were attached to the lower end at the notch 7 so that the total weight from the notch 6 down was 0.5 gram. Notch 7 is smaller than notch 6 so as to insure breakage at notch 6. The temperature of the sample was increased at the rate of about 1.5° C. per minute as the breaking temperature was approached by slowly increasing the potential across the heating element 15. The sample broke at 305° C. and the NST for the sample is therefore 305° C. Differences of 5° C. up to about 325° C. are considered significant. All NST values hereinafter referred to were determined on a sample of the same dimensions in a similar apparatus. NST values are found to be independent of the sample heat treatment, so long as extreme temperatures which produce thermal decomposition are avoided.

Figure 4:
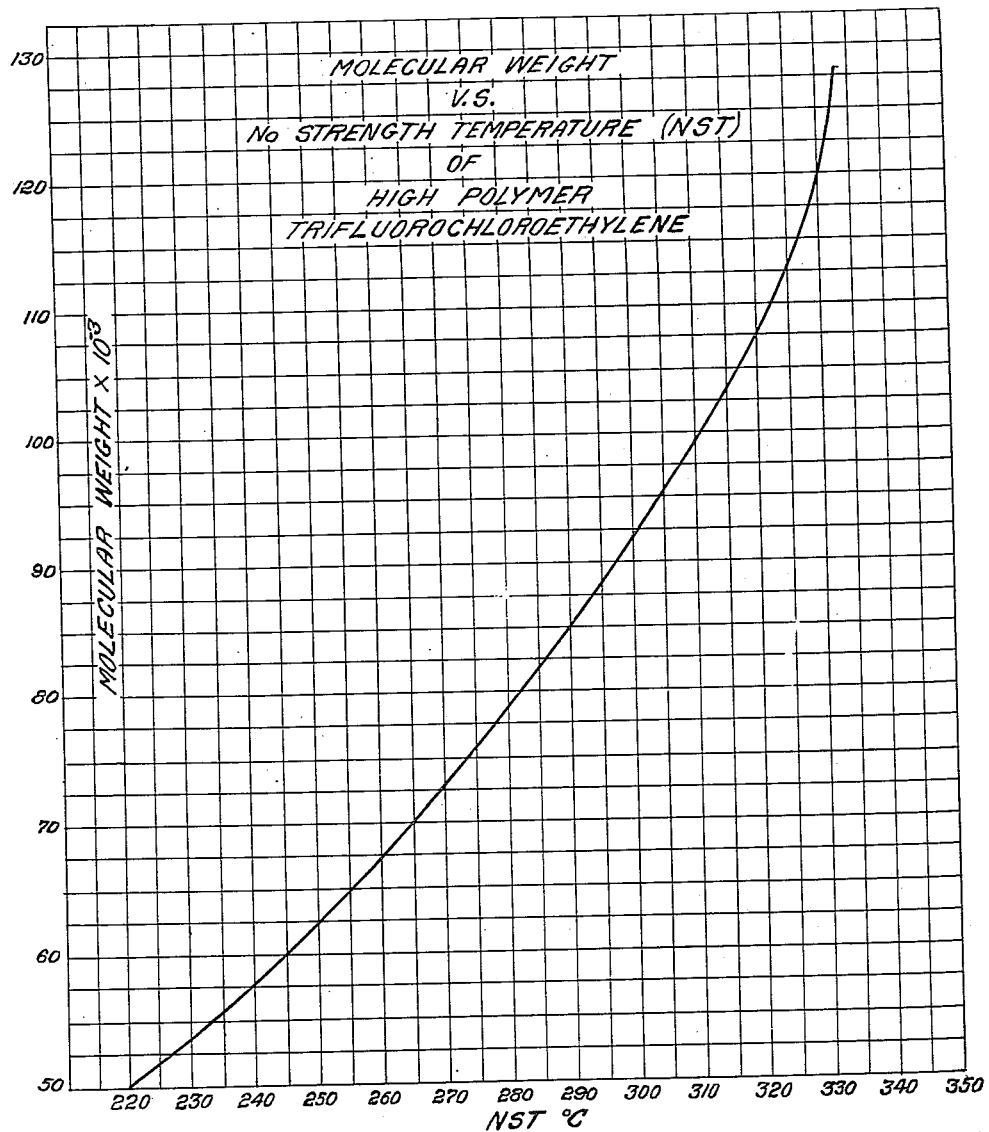
Fig. 4 is a graph showing the relation between the molecular weight and the no-strength temperature, NST, of the high polymer trifluorochloroethylene of this invention.

As illustrated in Fig. 4 the no-strength temperature increases with the molecular weight with a progressive tendency of the curve toward flattening at the high molecular weights.

The high polymeric trifluorochloroethylene of this invention is especially advantageous in that it combines ease of fabrication with usually high use temperatures in addition to its properties of high stability and desirable physical properties. In fact the high molecular weight trifluorochlorethylene polymer possesses a unique and unpredictable combination of useful properties. In molding and extrusion operations the plastic is processed in general as a high softening temperature thermoplastic and can in general be satisfactorily handled with equipment of conventional design constructed to operate at temperatures in the range of from 210° to 330° C. Chromium, stainless steel and aluminum are generally satisfactory air oxidation resistant materials for contact with the plastic at processing temperatures.

The product of this invention is orientable to form material with increased tensile strength in the direction of orientation. Orientation is accomplished below the transition temperature and above room temperature, preferably by quenching extruded material and then mechanically stretching, preferably in the range of 100°–150° C.

The high molecular weight polytrifluorochloroethylene is moldable by compression and transfer molding in a range of temperature from about 210° to 310° C. depending upon the no-strength temperature of the polytrifluorochloroethylene and also the molding pressure. The molding pressures for compression and transfer molding range from 500 to 25,000 pounds per square inch and preferably between 700 and about 1,400 pounds per square inch. The high molecular weight polytrifluorochloroethylene may be injection molded under injection molding pressures of from 5,000 to 35,000 pounds per square inch pressures or higher when suitable equipment is available. The polymer is injection molded at a temperature of about 250° to about 300° C., preferably slightly less than 300° C.

The following is a typical procedure for the preparation of sheets from the plastic of the invention. A polymer having a NST of about 305° C. and prepared by the method of Example 8 was placed in the form of small chips between thin polished chrome platens in a hydraulic press held at 300–310° C. The polymer was piled in the center of the platens and thin metal stops were placed at their edges to control the final thickness of the pressed sheet. The sample was preheated for five minutes with slight pressure applied to facilitate heat transfer. The pressure was gradually increased after five minutes so that the polymer was compressed and began to flow out at such a rate that after ten minutes, the platens were in contact with the metal stops. The platens and pressed sheet were then removed from the press and cooled. For the production of 1/8" by about 10" round sheet final pressures of the order of 400 pounds per square inch are convenient. Higher pressures are necessary for the production of very thin sheet, as for example, 5/1000" which is conveniently pressed between aluminum foil. Press platen temperatures below 300° C. may be utilized as for example about 275° C. and even lower temperatures (so long as they are above the transition temperature of the high polymeric trifluorochloroethylene) depending upon the type molding and available pressure. Temperatures below about 300° C. are preferable where longer molding times are involved.

At molding temperatures the plastic is sufficiently fluid for good adherence to roughened metal surfaces in producing protective coatings and may for example be used to coat and completely fill the interstices of 100 mesh stainless steel wire cloth by hot pressing the wire cloth between thin plastic sheets. Similar technique may be used to insulate wires or conducting metal strips for electrical purposes as well as more conventional extrusion procedures.

Small molded articles such as rings, plugs, flanged test tubes, threaded tube couplings, blanks for machining valve parts may be readily fabricated for example by transfer molding technique. Tubing and rods may be extruded and wire insulated for electrical purposes. Fibers and filaments may be produced. Such fibers are valuable for the production of chemically resistant filter cloth, protective clothing, screening and the like.

It may be desirable in the annealing to relieve internal stresses brought about, for example, by uneven cooling. This may generally be satisfactorily accomplished by heating at about 125° C. for from 2 to 48 hours.

The rate at which the polymer is cooled from above its transition temperature at about 210° C. affects its physical properties. One of the properties affected is hardness. To illustrate, 1/8" sheet samples of polymer with a NST of 307° C. were subjected to various cooling procedures and the hardness of the samples determined. The hardness is expressed in Vickers hardness numbers abbreviated VHN. Measurements were made with an Eberbach Microhardness Tester, manufactured by Eberbach and Sons Co., Ann Arbor, Michigan. All samples were pressed according to the typical procedure outlines above, removed from the press at about 310° C. and then cooled by the method indicated in Table 2 below, except for the last sample which was left in the press under pressure and allowed to cool very slowly with the press.

*Table 2*

| Cooling Procedure | VHN |
| --- | --- |
| 1. Sample quenched in water at 16° C | 6.7 |
| 2. Sample transferred to a press with platen temperatures regulated at 50° C | 7.8 |
| 3. Sample transferred to a press with platen temperatures regulated at 125° C | 8.8 |
| 4. Sample transferred to a press with platen temperatures regulated at 150° C | 9.1 |
| 5. Sample slow-cooled in box insulated with glasswool | 10.1 |
| 6. Sample slow-cooled in hot press | 11.4 |

The softening obtained in the quenched sample may be applied practically in the production of valve seats and gaskets. When articles of substantial thickness are prepared they may be quenched to soften their surfaces but because of poor heat transfer the interior is less effectively cooled and becomes relatively hard due to crystallization. This treatment gives the desirable combination of a relatively soft surface and a hard body which resists deformation. The quenched material is more flexible than the slow-cooled material, the quenched higher NST material being more pliable in general than quenched low NST material. The rapid cooling involved in quenching from above the transition temperature tends to prevent crystallization and the quenched polymer is a substantially non-crystalline form. It is significant that many of the properties which normally are obtained only by plasticization of polymeric materials can be produced with this polymer by thermal treatment alone, i. e. quenching.

The physical properties of the polymer of the invention may be changed by heat treatment subsequent to the initial pressing and cooling. For example, a quenched sample of high molecular weight polymer prepared by the method of Example 8 is hardened by heating it above the transition temperature, for example, to about 225° C. or above and cooling it slowly to room temperature in a matter of minutes. Conversely slow-cooled material of the same type is softened by heating it to about 218° C. and quenching it, for example, dropping it in cold water. Evidently these higher polymers have a transition temperature above which samples lose the physical properties acquired by previous cooling or heat treatment history, as will be more fully described below. Quenched material is highly transparent in thin sheets, less than about ⅛ inch, whereas slow-cooled material is translucent.

Heat treating may be performed below the transition temperature by prolonged heating, the rate of subsequent cooling not being significant. A quenched sample of polymer similar to that prepared in Example 8 was heated to 190±5° C. for three days. The VHN increased from 6.7 to 10.1. A similar sample heated at 132° C. for ten days had a VHN of 8.9, and after 28 days at 157° another similar sample had a VHN of 9.0. The trend is for lower NST material to undergo more rapid hardening on heat treatment. Quenched polymer sheets which have been heat treated to produce properties such as hardness similar to those of the slow-cooled material is rendered less transparent by the process but remains considerably more transparent than slow-cooled material of corresponding thickness and molecular weight and has higher impact strength. As indicated above quenching from the transition temperature minimizes crystallization and the quenched polymer is substantially non-crystalline in nature but may contain some small crystallities. On the other hand slow-cooling the polymer from the transition temperature favors crystallization and the slow-cooled polymer is a substantially crystalline form. It contains relatively large sized crystallites as indicated by their ability to scatter visible light and the slow-cooled polymer has a translucent or milky appearance even in the relatively thin sections. The trend is for the lower NST material to show the greatest milkiness. Heating the quenched polymer at temperatures approaching the transition temperature as for example at 190° C. substantially increases the proportion of crystalline regions but in a microscopically uniform manner so that the crystallites are of a very small size and the heat-treated polymer is substantially microcrystalline in nature. In the heat-treated polymer most of the crystallites are too small to scatter visible light and the heat-treated polymer is relatively transparent by comparison with the slow-cooled polymer. The microcrystalline heat-treated quenched polymer is relatively flexible, resistant to fracture by impact and transparent in comparison with the slow-cooled, microcrystalline material. The properties are particularly useful as the material does not undergo further change at temperatures up to the heat treating temperatures. It will be seen that by varying the thermal treatment of the solid plastic very useful changes in physical properties covering a considerable range may be made inexpensively and without affecting the chemical stability of the plastic.

It is an inherent and valuable property of the polymer of this invention that its physical properties may be controlled by the various methods of thermal treatment described above.

The trifluorochloroethylene high NST polymer undergoes changes in physical properties as a result of thermal treatments which are characteristic of the composition. When relatively thin transparent quenched samples of the polymer are heated to approximately 200° C. they tend to become milky. The milkiness increases with temperatures and reaches a maximum at about 210° C., followed by a sharp clearing of milkiness at 212–214° C., and this clearing is also characteristic of slow-cooled and heat-treated polymer, conversely when the cleared samples are cooled from above about 214° C. at about 1° per minute, a milkiness develops at about 188–182° C. Table 3 lists the clearing and clouding temperatures for samples over a range of NST values.

Table 3

| NST of Samples, °C. | Clearing Temp., °C. | Clouding Temp., °C. |
|---|---|---|
| 313 | 212–213 | 187–182 |
| 285 | 212–213 | 186–184 |
| 262 | 212–213 | 187–186 |
| 247 | 213–214 | 185–184 |
| 233 | 212–213 | 186–185 |

The transition of physical properties and the clearing of milkiness both occur at substantially the same temperature. The clearing phenomena is believed to be associated with the transition of crystallites which have a different index of refraction to the amorphous polymer. The crystallites also rotate the plane of polarized light and the transition temperature may also be readily observed by utilizing polarized light to observe the disappearance of crystallites—such as by observation between crossed Nicol Prisms. Hence the transition at the clearing temperature is characteristic of the high polymeric trifluorochloroethylene and is reproduceably determined as described. The unusual stability of the super-cooled or quenched polymer at use temperatures as regards crystallization is an especially valuable characteristic of high molecular weight polytrifluorochloroethylene. As the transition temperature is independent of the NST of the sample used or the method of preparation of the polymer over a wide range of conditions it is considered to be a characteristic of the trifluorochloroethylene polymers having NST's of at least 225° C. Also, as NST values are indications of relative molecular weight this property is independent of molecular weight over a wide range.

The index of refraction of transparent quenched high NST polymer was found to be 1.43. No significant variation was shown within the accuracy of measurement over a wide NST range, however slow-cooled and heat-treated material had a slightly higher index than the quenched polymer.

The density of the high polymer was found to vary from 2.11 for quenched polymer to about 2.13 for slow cooled samples. Heat-treated material had a maximum observed density slightly greater than for slow-cooled material.

The solid polymer has a specific resistance of about $5 \times 10^{17}$ ohms at room temperature and gives an indication of being a good insulator by its tendency to hold a static charge.

Under tensile stress the quenched solid polymers undergo deformation and orientation. After orientation in testing (⅛ x ⅛ x 1″ test sections) typical quenched polymer samples of NST in the range of 290 to 325° were found to have tensile strengths lying principally in the range of 8 to $10 \times 10^3$ pounds per square inch at break calculated on the basis of the final cross sectional area after elongation. The softer high polymeric trifluorochloroethylene obtained by quenching showed the greatest elongation and lowest peak loads during tensile strength measurements although final breaking strengths calculated on the basis of final cross-sectional areas were high. The more crystalline harder type materials obtained by slow-cooling or by heat treatment exhibited the greatest peak loads during tensile measurements with relatively small elongations. For example, the samples for which VHN are given in Table 1 showed peak loads ranging from about 50 lbs. for the softest material to about 70 lbs. for the hardest sample listed. Peak loads were found for other samples of the dimensions given above ranging to about 75 lbs.

Stretching at 130° C. 2.54 cm. test sections of a polymer sample of NST 302° C. to total lengths of 10.5, 12.5, and 23.5 cm. yielded breaking strengths of 19, 24 and $34 \times 10^3$ lbs. per square inch calculated as indicated above. The stretching produces orientation of the polymer molecules. Polymer slow-cooled from above the transition temperature of approximately 210°±5° C. or quenched material which is heat treated below the transition temperature in the approximate range of 175 to 200° C. requires a greater stress than the quenched material to produce distortion but undergoes less elongation before breaking.

In order to determine the extent to which the NST affects plastic flow, samples of polymer of uniform size but having a range of NST values were subjected to a known pressure at 225° C. The determination was made with a parallel plate plastometer at 225° C. at which temperature the effect of past thermal history on properties is removed. Table 3 lists the final thickness of sample disks of 3/8" diameter and 1/8" thickness which had been exposed to a 50 pound force for 20 minutes at 225° and the corresponding NST for the sample. The greater ease of flowing out of the lower NST material is apparent and demonstrates the greater melt viscosity of the higher NST higher molecular weight material. This test behavior differentiates the high molecular weight polytrifluorochloroethylene from relatively low molecular weight material of the type prepared by I. G. F. which softens at about 100° C. and shows little resistance to flow at 225° C. under the conditions of the test.

*Table 4*

| NST | Thickness in Mils |
|---|---|
| 335° | 29.2 |
| 299° | 23.5 |
| 280° | 20.9 |
| 262° | 18.4 |
| 247° | 14.6 |
| 229° | 11.4 |

Whereas over a considerable range of NST thermal treatment is the most helpful variable in determining the physical properties of the composition at ordinary temperatures, thermal treatment has no appreciable effect on chemical properties. The composition is non-flammable and is not attacked by strong mineral acids or oxidizing agents such as chromic-sulfuric acid, hydrochloric acid, chlorine gas nor by strong alkalis such as NaOH. It resists attack by fluorine gas but may react with fluorine on heating or when in contact with other reactive materials such as hydrocarbon oils in the presence of fluorine. Samples of polymer which had been very carefully purified and cleaned were used with good results as gasket materials in the presence of fluorine at 150° C. At temperatures above about 300° C., the polymer begins to be unstable and ultimately undergoes thermal decomposition. Solid high molecular weight polytrifluorochloroethylene polymer having a NST of about 250° C. is substantially insoluble in various solvents such as hexafluoroxylenes $C_6H_4(CF_3)_2$, di-n-butylphthalate, 1,2,3,4-tetrachloroperfluorobutane, tetrachloroethylene, ethylene glycol diethyl ether, "Dowtherm," a mixture of 75% diphenyl ether and 25% diphenyl, benzyl alcohol, perfluorodimethylcyclohexanes, pyridine, liquid chloropropane, hexachlorobutadiene, chloroform, acetone, trichloroethylene, nitrobenzene, xylene, 1,2,3-trichloroperfluoropropane, bromobenzene, quinoline, 2-nitropropane, nitromethane, carbon tetrachloride, 1,2-dichloroperfluorocyclobutane, dioxane, 1,1,2-trifluorotrichloroethane, ethyl benzene, and methylene chloride as tested at 50° C. for 2 to 3 days. It absorbs certain relatively low molecular weight solvents such as chloro and chlorofluoro compounds, benzene and acetone to varying extents with swelling.

The following table sets forth the absorption of various representative liquid organic compounds by a 1/8 by 2½ by ½ inch strip or quenched high molecular weight trifluorochloroethylene 300° no-strength temperature polymer, at 45° C. for 40 hours. The absorption of each compound in the high molecular weight polymer is expressed in moles per 100 grams of polymer $\times 10^3$.

*Table 5*

| Organic compounds | Absorption |
|---|---|
| $CH_3(CH_2)_4CH_3$ | 0.6 |
| $C_6H_6$ | 8.8 |
| $CH_2Cl_2$ | 10.0 |
| $CHCl_3$ | 11.3 |
| $CCl_4$ | 6.7 |
| $CHCl=CHCl$ | 27.4 |
| $CHCl=CCl_2$ | 29.8 |
| $CCl_2=CCl_2$ | 10.5 |
| $CF_2CClFCClFCF_2$ | 3.1 |
| $CClF_2CCl_2F$ | 19.7 |
| $CCl_2FCCl_2F$ | 12.5 |
| $CClF_2CCl_3$ | 12.6 |
| $CH_3COCH_3$ | 3.8 |

Under the conditions of the above experiment

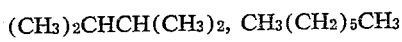

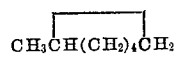

$CCl_2=CClCCl=CCl_2$, $CF_3(CF_2)_5CF_3$, $C_6F_{10}(CF_3)_2$ (*m* and *p*), and $C_2H_5OH$ are not measurably absorbed by high molecular weight trifluorochloroethylene.

From this it is seen that at 45° C. appreciable quantities of benzene, methylene chloride, chloroform, carbon tetrachloride, dichloroethylene, trichloroethylene, tetrachloroethylene, 1,1,2-trifluorotrichloroethane 1,2 and 1,1-difluorotetrachloroethane were absorbed in 40 hours. On the other hand negligible quantities of n-heptane, n-hexane, methyl cyclohexane, alcohol, perfluoroheptane, perfluorodimethyl cyclohexane were absorbed under the same conditions. With a given solvent the relatively crystalline slow-cooled or heat-treated material swells less than material quenched from above the transition temperature. The slow-cooled polymer shows less solvent absorption than the quenched polymer and the quenched polymer heat-treated at 190–195° C. shows less solvent absorption than the slow-cooled polymer for the same molecular weights. This is illustrated by the data of Table 6 which presents measurements carried out with benzene, chloroform, 1,1,3-trifluorotrichloroethane and trichloroethylene.

Table 6.—Effect of crystallinity on solvent absorption by trifluorochloroethylene high molecular weight polymer (NST=308° C.)

Temp.: 45° C.
Time: 3 days.
Sample Dimensions: 2½" x ½" x ⅛" (approx.).

| Sample Preparation | Absorption of Solvent; mol./100 g. polymer×10³ | | | |
|---|---|---|---|---|
| | CHCl=CCl₂ | CF₂ClCFCl₂ | CHCl₃ | C₆H₆ |
| Quenched [1] (clear) | 34.5 | 23.5 | 14.9 | 12.5 |
| Slow-cooled [2] (very cloudy) | 22.1 | 12.7 | 6.0 | 6.2 |
| Heat-treated [3] (hazy) | 14.0 | 5.9 | 3.23 | 2.7 |

[1] Quenched in water from approx. 300° C.
[2] Slow-cooled in press from 300° C.
[3] Prepared by heating quenched polymer 3 days at 190-195° C.

Similarly a 2" x ½" x ⅛" sample of sample 1 of Table 2 above absorbed 0.101 mol. of trichloroethylene per 100 g. of polymer during 3 days at 59° C. A 2" x ½" x ⅛" sample of sample 5 of Table 2 absorbed 0.053 mol. of trichloroethylene per 100 g. of polymer during 3 days at 59° C. Fluorocarbons are relatively negligible in absorption under the same conditions. The behavior of high polymeric trifluorochloroethylene in resisting swelling by fluorocarbon such as the perfluorodimethyl cyclohexane was a particularly surprising result. In this regard high polymer trifluorochloroethylene is even more resistant than teflon, polytetrafluoroethylene, an especially insoluble polymer.

Modified properties of the solid polymer are obtained by swelling agents illustrated above which act as plasticizers. Lower members of the saturated perfluorochlorocarbon series with physical properties ranging from oils to waxes are particularly valuable for this purpose. They are highly compatible with the relatively non-crystalline or quenched high polymer and avoid reduction of the desired properties of chemical inertness. The preferred procedure for the preparation of the plasticized material is by hot milling the plasticizer and polymer together or by mixing in the barrel of an extrusion machine. The quenched plasticized material is softer, more flexible, and more rubbery than the pure solid polymer. Both transition temperature and NST are lowered by plasticization of the plastic.

EXAMPLE 12

Plasticized polytrifluorochloroethylene compositions suitable for molding and extrusion were prepared as follows:

Six pounds 8 ounces of polytrifluorochloroethylene with a NST of 324° C. were placed in a large wide mouth bottle and 10.4 ounces (10% of weight of solid polymer) of a low vapor pressure liquid polytrifluorochloroethylene polymer with an average molecular weight of about 750 were added. The bottle and contents were placed in a 60° C. oven for 48 hours. The plastic mixture was then removed from the bottle and milled on a roll mill heated initially to 180 to 190° C.

Another composition was prepared by mixing ground solid polymer NST 324° C. with a polytrifluorochloroethylene oil at room temperature in a dough mixer and then working the mixture on a roll mill at 180 to 230° C. for 5 minutes. The mixed mixture was removed from the mill and pressed rapidly to ⅛ inch sheets at 300° C., total press time being 2 minutes. Plasticizer oil loss tests on sample sheets in a 60° C. air oven showed weight losses after 76 days of 0.02% at 10% plasticizer, 1.78% at 30% plasticizer, and 12.79% at 60% plasticizer, as against 0.03% for a check sample of unplasticized solid polymer which value was within the experimental error of measurement. The plasticizer was incompletely soluble at room temperature in the case of the 60% sample above.

The plastic polytrifluorochloroethylene of the invention can be used for a wide variety of purposes. For example, laboratory test tubes, beakers, bottles and the like can be made by pressure die molding methods, tubing of various sizes can be made by extrusion methods, other equipment and parts can be made by machining, etc. Such chemical ware is valuable for working with highly corrosive materials at moderate temperatures. Other articles made from the plastic include gaskets, valve seats, insulation for wires and similar conductors, transparent sheets, and machine parts. The plastic can be drawn out into threads which can be stretched to orientate the polymer chains to give increased tensile strength. Additives such as metal powders, pigments and coloring agents, can be worked into the plastic to impart special properties.

The most valuable plastic polytrifluorochloroethylene of the invention, from the standpoint of mechanical properties, are those with no-strength temperatures of at least 225° C. and particularly those with no-strength temperatures above about 250° C. The choice of preferred no-strength temperature is dependent upon the final application desired and thermal treatment to be used in fabrication. The easier flow properties during fabrication of the lower range NST material which are, for example, especially advantageous when it is desired to cause the material to flow into small openings must be balanced against the superior mechanical properties of the higher NST material especially for high temperature use. The softest most transparent fully quenched material and the strongest fibers have been produced from material with an NST above 300° C.

The product of this invention is solid high molecular weight trifluorochloroethylene. It will be understood that reference in this description to plastic product, plastic trifluorochloroethylene or other reference to polymer product of this invention refers to solid high molecular weight trifluorochloroethylene. Resilience as referred to herein in relation to solid high molecular weight trifluorochloroethylene refers to the property of a material in resisting permanent deformation.

This invention relates to a high molecular weight thermoplastic polymer of unique and unexpected characteristics and combination of characteristics which have been illustrated in both general and specific terms. The examples and theory are offered for the purpose of a better understanding of the invention and should not be construed as unnecessarily limiting the invention. Also, many additional valuable properties of this polymer may be found by those skilled in the art without departing from the scope of the invention.

I claim:

1. A composition of matter comprising a solid homopolymer of trifluorochloroethylene resilient, orientable, substantially inert and having a molecular weight of at least 50,000, a transition temperature of about 210° C., a no-strength temperature of at least 215° C., moldable as a thermoplastic at temperatures not substantially below the transition temperature and substantially insoluble in any solvent at temperatures below 30° C.

2. A composition of matter comprising a solid homopolymer of trifluorochloroethylene resilient, orientable, substantially inert and having a molecular weight of at least 50,000, a transition temperature of about 210° C., a no strength temperature of at least 215° C., a tensile strength of at least $2.5 \times 10^3$ pounds per square inch and being tough, moldable as a thermoplastic at temperatures not substantially below the transition temperature and substantially insoluble in any solvent at temperatures below 30° C.

3. A solid homopolymer of trifluorochloroethylene resilient, substantially inert and having a molecular weight of between 50,000 and 300,000, a density of at least 2.1, a transition temperature of about 210° C., a no-strength temperature in excess of 215° C., an index of refraction of about 1.43, moldable as a thermoplastic at temperatures not substantially below the transition temperature and substantially insoluble in any solvent at temperatures below 30° C.

4. A solid crystalline homopolymer of trifluorochloroethylene which is resilient, orientable, substantially inert and having a molecular weight between about 50,000 and 300,000, a transition temperature of about 210° C., a no strength temperature of at least 215° C., a tensile strength of at least 3.5×10³ pounds per square inch, being moldable as a thermoplastic at temperatures not substantially below the transition temperature, substantially insoluble in any solvent at temperatures below 30° C., and by comparison with the quenched polymer relatively hard, resistant to deformation and exhibiting substantially reduced solvent power for organic compounds; prepared by slow cooling the polymer from above the transition temperature to a temperature substantially below the transition temperature.

5. A substantially non-crystalline solid homopolymer of trifluorochloroethylene which is resilient, orientable, substantially inert, having a molecular weight between about 50,000 and 300,000, a transition temperature of about 210° C., a no strength temperature of at least 215° C., a tensile strength of about 2.5×10³ pounds per square inch and impact strength of at least 3 foot pounds per square inch of notch, being moldable as a thermoplastic at temperatures not substantially below the transition temperature, substantially insoluble in any solvent at temperatures below 30° C., and by comparison with slow cooled polymer not brittle at low temperatures, relatively soft and more compatible with solvents and plasticizers at ordinary temperatures; prepared by quenching the polymer from above its transition temperature to a temperature below said transition temperature.

6. A composition of matter comprising a solid homopolymer of trifluorochloroethylene being resilient, orientable, substantially inert and having a molecular weight of at least 50,000, a transition temperature of about 210° C,. a no strength temperature of at least 225° C., a tensile strength of at least 2.5×10³ pounds per square inch, a density of at least 2.1, an index of refraction of about 1.43, moldable as a thermoplastic at temperatures not substantially below the transition temperature and substantially insoluble in any solvent at temperatures below 30° C.

7. A composition comprising a solid homopolymer of trifluorochloroethylene and a plasticizer consisting of a perfluorochlorocarbon in the liquid to wax range, said solid homopolymer of trifluorochloroethylene being resilient, orientable, substantially inert and having a molecular weight of at least 50,000, a transition temperature of about 210° C., a no strength temperature of at least 215° C., moldable as a thermoplastic at temperatures not substantially below the transition temperature and substantially insoluble in any solvent at temperatures below 30° C.

8. A composition comprising a solid homopolymer of trifluorochloroethylene and a low vapor pressure liquid polytrifluorochloroethylene, said solid homopolymer of trifluorochloroethylene being resilient, orientable, substantially inert and having a molecular weight of at least 50,000, a transition temperature of about 210° C., a no strength temperature of at least 215° C., moldable as a thermoplastic at temperatures not substantially below the transition temperature and substantially insoluble in any solvent at temperatures below 30° C.

References Cited in the file of this patent

UNITED STATES PATENTS

| | | |
|---|---|---|
| 2,230,654 | Plunkett | Feb. 4, 1941 |
| 2,456,255 | Coffman | Dec. 14, 1948 |
| 2,497,046 | Kropa | Feb. 7, 1950 |
| 2,579,437 | Miller | Dec. 18, 1951 |
| 2,586,550 | Miller | Feb. 19, 1952 |
| 2,667,474 | Miller | Jan. 26, 1954 |

FOREIGN PATENTS

| | | |
|---|---|---|
| 465,520 | Great Britain | May 3, 1937 |
| 578,168 | Great Britain | June 18, 1946 |